United States Patent
Regentov

(10) Patent No.: US 11,323,461 B2
(45) Date of Patent: May 3, 2022

(54) SYSTEMS AND METHODS FOR INTERCEPTING MALICIOUS MESSAGES BASED ON APPLICATION PRIORITY

(71) Applicant: AO Kaspersky Lab, Moscow (RU)

(72) Inventor: Georgy A. Regentov, Moscow (RU)

(73) Assignee: AO Kaspersky Lab, Moscow (RU)

(*) Notice: Subject to any disclaimer, the term of this patent is extended or adjusted under 35 U.S.C. 154(b) by 377 days.

(21) Appl. No.: 16/745,425

(22) Filed: Jan. 17, 2020

(65) Prior Publication Data

US 2020/0412746 A1   Dec. 31, 2020

(30) Foreign Application Priority Data

Jun. 28, 2019   (RU) .......................... RU2019120221

(51) Int. Cl.
*H04L 9/40* (2022.01)
*G06N 20/00* (2019.01)
*H04L 29/06* (2006.01)

(52) U.S. Cl.
CPC ......... *H04L 63/1416* (2013.01); *G06N 20/00* (2019.01); *H04L 63/1425* (2013.01)

(58) Field of Classification Search
CPC .. H04L 63/1416; H04L 63/1425; G06N 20/00
USPC ........................................................ 726/23
See application file for complete search history.

(56) References Cited

U.S. PATENT DOCUMENTS

| | | | | |
|---|---|---|---|---|
| 8,402,543 B1* | 3/2013 | Ranjan | ................ | H04L 63/1416 713/100 |
| 8,549,642 B2* | 10/2013 | Lee | ........................ | H04L 63/145 709/224 |
| 8,776,219 B2* | 7/2014 | Bisso | .................... | H04L 63/145 726/1 |
| 9,215,239 B1* | 12/2015 | Wang | ...................... | G06F 21/56 |
| 9,838,420 B2* | 12/2017 | Prokudin | .............. | H04L 63/145 |
| 9,842,219 B1* | 12/2017 | Gates | .................... | G06F 21/552 |
| 10,902,117 B1* | 1/2021 | Singh | ..................... | G06N 5/025 |
| 2006/0212428 A1* | 9/2006 | Nelson | ................ | G06F 16/2453 |
| 2008/0208363 A1* | 8/2008 | Grgic | .................... | G05B 19/042 718/103 |
| 2012/0042384 A1* | 2/2012 | Badhwar | ............... | G06F 21/128 726/25 |

(Continued)

*Primary Examiner* — Badri Champakesan
(74) *Attorney, Agent, or Firm* — ArentFox Schiff LLP; Michael Fainberg

(57) ABSTRACT

Disclosed herein are systems and method for intercepting malicious messages for training a malware detection classifier. In an exemplary aspect, an application selection module may select, from a plurality of applications, an application for execution in an execution environment based on a priority level of the application. During the execution of the selected application, a network interception module may monitor network activity comprising information about data being sent and received over a network connected to the execution environment and storing the network activity in memory of the execution environment (e.g., in a network activity log). A message selection module may subsequently extract, from the stored network activity, an electronic message, in response to determining that the electronic message corresponds to the selected application, may storing the electronic message in a message database used for training the malware detection classifier.

18 Claims, 3 Drawing Sheets

(56) References Cited

U.S. PATENT DOCUMENTS

| | | | |
|---|---|---|---|
| 2015/0112752 A1* | 4/2015 | Wagner | G06F 3/0482 705/7.26 |
| 2015/0161024 A1* | 6/2015 | Gupta | G06N 5/043 714/47.3 |
| 2015/0281267 A1* | 10/2015 | Danahy | H04L 63/1416 726/23 |
| 2017/0098086 A1* | 4/2017 | Hoernecke | G06Q 10/10 |
| 2018/0048660 A1* | 2/2018 | Paithane | G06F 21/566 |

* cited by examiner

SYSTEMS AND METHODS FOR INTERCEPTING MALICIOUS MESSAGES BASED ON APPLICATION PRIORITY

CROSS-REFERENCE TO RELATED APPLICATION

This application claims benefit of priority under 35 U.S.C. 119(a)-(d) to a Russian Application No. 2019120221 filed on Jun. 28, 2019, which is incorporated by reference herein.

FIELD OF TECHNOLOGY

The present disclosure relates to the field of information technology (IT) security, and more specifically, to methods of intercepting malicious messages.

BACKGROUND

In the modern world nearly everyone makes use of electronic messages. Emails and instant messages are a convenient medium for both corporate and social communication. In some cases, email addresses and social media usernames are also a popular way of identifying users on the Internet. Therefore, electronic messages are a tempting target for hackers, who can use the email addresses and usernames of victims to send messages containing links to malicious files, infected sites (sites with malicious code), unwanted advertising materials, etc.

For the protection of users against such messages (hereinafter referred to as malicious messages), various technologies are used, which can be realized by protection means such as antivirus software, which work both on the client side (e.g., the user's computer) and on the server side (e.g., email servers). Means such as antivirus software need to be "taught" in order to distinguish safe email messages from malicious ones. Training datasets comprising electronic messages are used for teaching classification systems of antivirus software and for generating other means of detection of malicious messages such as signatures. However, training datasets are difficult to generate because of a lack of timely access to different kinds of malicious messages and an imbalance on the amount of messages originating from a particular source. For example, training datasets that largely comprise malicious messages from a particular application may underrepresent the types of malicious messages originating from a different application that is not updated frequently. A classifier (e.g., a machine learning-based classifier) trained with such a dataset may be unable to successfully detect all types of malicious messages and may be over-trained—thus producing false positives. Not to mention, intercepting malicious messages for all applications may be resource consumptive for any computing device.

The timely access to new types of malicious messages by IT experts enables improved security configurations for detecting malicious messages that protect users and their computing devices against the latest threats in a network. Because manual generation of training datasets is time-consuming and prone to false positives, there is a need for an efficient method for quickly generating balanced datasets by searching and obtaining various types of malicious messages based on their associated application's priority.

SUMMARY

Aspects of the disclosure relate to the field of data security. In particular, aspects of the disclosure describe methods and systems for intercepting malicious messages for training a malware detection classifier.

In an exemplary aspect, an application selection module may select, from a plurality of applications, an application for execution in an execution environment based on a priority level of the application. During the execution of the selected application, a network interception module may monitor network activity comprising information about data being sent and received over a network connected to the execution environment and storing the network activity in memory of the execution environment (e.g., in a network activity log). A message selection module may subsequently extract, from the stored network activity, an electronic message, in response to determining that the electronic message corresponds to the selected application, may storing the electronic message in a message database used for training the malware detection classifier.

In one aspect, wherein the plurality of applications comprises malicious applications and untrusted applications and is stored in an application database, the selecting of the application comprises calculating a respective priority level for each respective application of the plurality of applications, and in response to determining that the respective priority level for a respective application is greater than all other calculated priority levels, selecting the respective application for execution in the execution environment.

In one aspect, the respective priority level is inversely proportional to an amount of time elapsed since the respective application was added or modified in the application database.

In one aspect, the application selection module may determine an amount of computing devices that are connected to the network and on which the respective application is present. In this aspect, the respective priority level is directly proportional to the amount of computing devices.

In one aspect, the application selection module may calculate the respective priority level based on a formula:

$$p = \frac{n^a}{t^b}$$

wherein p is the respective priority level, n is an amount of computing devices on which the respective application is present; t is an amount of time elapsed since the respective application was added or modified in the application database, and a and b are power coefficients, where a>b>0.

In one aspect, the application selection module may assign a maximum priority level to the respective application in response to determining that the respective application is capable of performing data exchanges over the network.

In one aspect, determining that the electronic message corresponds to the selected application comprises determining that the extracted electronic message is marked with an identifier of a network-level protocol port used by the selected application for performing data exchanges over the network.

In one aspect, the execution environment is one of a computing device, a hypervisor with a virtual machine running, and an emulator.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
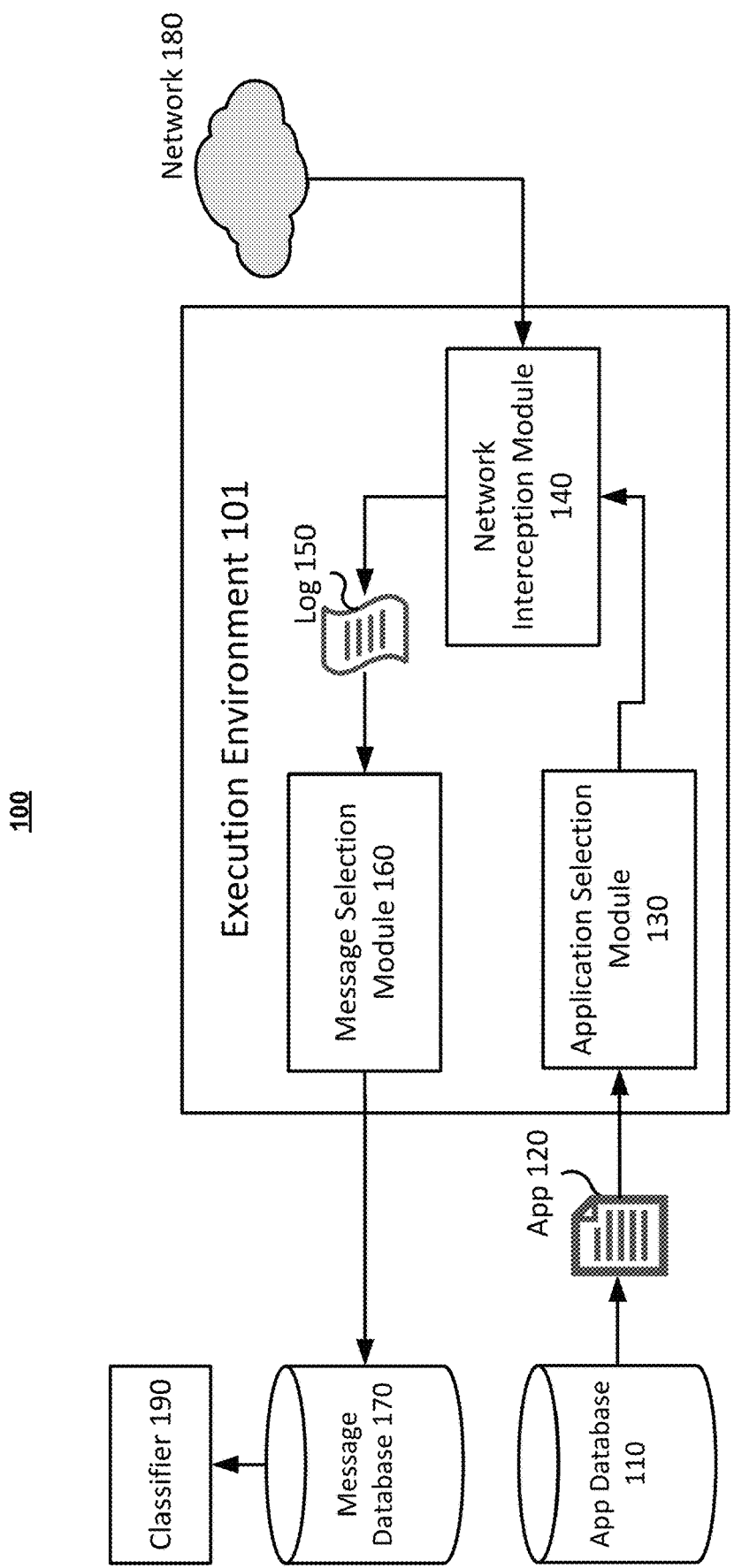
FIG. 1 shows a block diagram of a system for intercepting malicious messages based on application priority, in accordance with aspects of the present disclosure.

Exemplary aspects are described herein in the context of a system, method, and computer program product for spam identification. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

A number of definitions and concepts which will be used in the description of variant embodiments of the present disclosure are presented below.

A malicious application is an application able to cause digital harm to a computing device or to the data of the user of the computing device (e.g., a personal computer, server, smartphone, etc.). Such digital harm may include data corruption, data wipe, data theft, unauthorized encryption of files, unauthorized use for storage or computations, etc. Examples of a malicious application include a network worm, a keyboard logger, a computer virus and adware.

A trusted application is an application which does not cause digital harm to a computing device. A trusted application may be developed by a trusted software manufacturer or downloaded from a trusted source (e.g., a website listed in a database of trusted websites). In some aspects, a trusted application has an identifier by which the application can be uniquely identified (e.g., a hash sum of the application file) and which is kept in a database of trusted applications. The identifier of the manufacturer, such as a digital certificate, may also be kept in the database of trusted applications.

An untrusted application is an application which not trusted, but is also not recognized as digitally harmful by, for example, an antivirus application. In some cases, an untrusted application may, however, have malicious elements (e.g., dynamic libraries) injected into them, causing the untrusted application to become a malicious application. An untrusted application may afterwards be recognized as malicious, for example, with the aid of an antivirus scan.

A malicious file is a file which is a component of a malicious application, and which contains program code (executable or interpretable code).

An untrusted file is a file which is a component of an untrusted application, and which contains program code (executable or interpretable code).

A trusted file is a file which is a component of a trusted application.

Predetermined categories of applications include at least the category of "trusted application," the category of "untrusted application," and the category of "malicious application."

An electronic message is information sent or received by a computing device over a computer telecommunications network. Examples of electronic messages may be email messages, instant messaging messages, or any other information being sent in the network and containing text and/or other multimedia data encoded.

FIG. 1 shows a block diagram of system 100 for searching for specimens of malicious messages, in accordance with aspects of the present disclosure. System 100 comprises message selection module 160, network interception module 140, and application selection module 130. System 100 also includes application database 110 and message database 170. Modules 130, 140 and 160 function within execution environment 101.

The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (e.g., execution environment 101). Accordingly, each module may be realized in a variety of suitable configurations, and should not be limited to any particular implementation exemplified herein.

Execution environment 101 may be computing device comprising hardware and software capable of executing the commands (e.g., program code) written in the form of executable or source code. Execution environment 101 is characterized by a state representing the content of the data storage in execution environment 101. A primitive execution environment may be a Turing machine. In the context of the claimed invention, examples of an execution environment are an electronic computing device, a hypervisor with a virtual machine running, an emulator, or some other virtualization environment known in the prior art.

In one aspect of the present disclosure, databases 170 and 110 are located outside of execution environment 101, for example, on a computing device with which execution environment 101 can exchange data (e.g., a remote server or a host machine (a computing device in which a virtual device, such as an emulator or a guest virtual machine, is running)).

Application database 110 is configured to store applications (in the form of files), which may be intended for execution at execution environment 101. In one aspect, such applications are exclusively malicious applications. In one aspect, such applications are exclusively untrusted and malicious applications. In one aspect, such applications are applications carrying out network activity (e.g., applications configured to exchange data over network 180). For each application, the following information may be stored in application database 110: the date of appearance in the database; the number of computing devices on which that application is present; performance details regarding data exchange over network 180, for example, with the use of SMTP ports; the designation of the family of malicious applications to which the application has been assigned (if it is known that the application is malicious).

Performance details regarding data exchange (e.g., with the use of SMTP ports) by a certain application may be marked with an appropriate label in application database 110. The designation of the family of malicious applications to which the application has been assigned (e.g., by an expert in the field of information technologies or with the aid of automated means of detecting malicious applications (such as antivirus software)) may also be marked with an appropriate label in application database 110. For example, a label may indicate designation to a family such as "Trojan.SMTP." Entries of applications in application database 110 may be populated by an expert in the field of information security or by special software for adding/modifying the data in application database 110.

Application selection module 130 also operates within the execution environment 101. Application selection module 130 is configured to select an application from application database 110. When selecting the applications, in one aspect of the present disclosure, application selection module 130 determines an application priority level. In particular, application selection module 130 selects, from application database 110, the application with the highest priority level among the applications in application database 110.

An application priority level is a numerical evaluation of an application's importance. In some aspects, the priority level is inversely proportional to the amount of time elapsed since the appearance of information about a particular application in the application database. For example, an application that has not had information updates may have a higher priority level, as determined by application selection module 130, than an application that has had recent updates in application database 110.

In some aspects, the application priority level is directly proportional to the popularity of the application, where the popularity is determined by the number of computing devices on which that application is present.

In some aspects, the application priority level is dependent upon whether a particular application is malicious or untrusted. For example, the priority level of a malicious application, as determined by application selection module 130, may be higher than the priority level of any untrusted applications.

In some aspects, the application priority level is dependent upon whether an application is able to receive or transmit data over a network. For example, the application priority level, as determined by application selection module 130, may be higher for applications known to carry out network activity.

In some aspects, the application priority level is designated by an expert in the field of technology or by software having access to the information needed for determining the priority of a given application.

In some aspects, application selection module 130 computes the application priority level using the following formula:

$$p = \frac{n^a}{t^b}$$

where, p is the priority level of the application; n is the number of computing devices on which the application is present; t is the time elapsed since a recent information update about the application in application database 110 (e.g., measured in hours); and a and b are power coefficients, where a>b>0.

In some aspects, when calculating the application priority level in accordance with the aforementioned formula, application selection module 130 considers the performance details regarding data exchange with the use of SMTP ports, and also the designation of the family of malicious applications to which the application has been assigned. The aforementioned information about the application may be used to calculate the application priority level as follows.

If the application carries out an exchange of data over network 180 with the use of SMTP ports, application selection module 130 determines the priority level of that application to be the maximum possible priority level. For example, application selection module 130 may determine the priority levels for each application in application database 110 and may assign the priority level of the application that carries out data exchange with the use of SMTP ports as the highest priority level value of the calculated priority level values.

Additionally or alternatively, if the designation of the family of malicious applications to which the application has been assigned contains: "SMTP," "Mail," "Backdoor," or any other mention of the possibility of exchanging data in the network, application selection module 130 determines the priority level of that application to be the maximum possible priority level. Every manufacturer of antivirus software who determines the designation of the family of malicious applications uses their own naming rules, and therefore the mentioning of the possibility of a data exchange in the network is determined in view of these naming rules.

In some aspects, the maximum possible priority level is evaluated by application selection module 130 as a number significantly larger than the value which may be calculated by the aforementioned formula. If the priority level is a "maximum" for two applications, the application whose priority level as calculated by the aforementioned formula as the largest will be selected first.

The application selected by the application selection module 130 is sent to the execution environment 101 for subsequent execution. In FIG. 1, application selection module 130 selects application 120 from application database 110. Application 120 is then executed by execution environment 101.

Network interception module 140 forms the network activity log 150 of application 120. The network activity log 150 is a collection of records storing formalized information about the data (e.g., a binary representation of the data) being sent to and received from network 180. Such information may include the headers of data packets, the data from these headers, and the contents of the data packets (e.g., body of the packets).

In the course of forming the log 150, network interception module 140 creates and saves records, in the network activity log 150, comprising information about the data being sent through network 180 during the execution of application 120 (e.g., by corresponding system calls). In some aspects, network interception module 140 adds records comprising information about the data being sent to the network activity log 150, even if execution environment 101 does not directly carry out the sending of data through network 180.

In some aspects, the formalized information about the data comprises the content of network-level packets. In some aspects, the formalized information about the data comprises the content of application-level protocols, such as HTTP or IMAP. In some aspects, every record in the network activity log 150 is marked (e.g., by network interception module 140) with the number of the transport-level protocol port used for application 120 during the data exchange.

Network interception module 140 sends the generated network activity log 150 to message selection module 160. Message selection module 160 is configured to select electronic messages from the network activity log 150 generated by network interception module 140. In some aspects, the electronic messages selected are being sent or dispatched by application 120, which is executed within the execution environment 101. In some aspects, the electronic messages selected are received by the application 120, which is executed within the execution environment 101.

Message selection module 160 may detect electronic messages and other text messages from binary data in the generated network activity log 150 using packet analyzer software (e.g., Wireshark™) or any other deep packet inspection (DPI) means. For example, message selection module 160 may extract and select electronic messages from the network activity log 150 by searching for headers of email messages and selecting the identified email messages from the network activity log 150.

The electronic messages selected using the above described method are used by message selection module 160 to replenish message database 170. Specifically, message selection module 160 stores the messages in message database 170. Messages stored in message database 170 may be used to train a machine-learning based classifier 190 for detecting spam messages and malicious applications carrying out spam messages. Classifier 190 may be implemented in execution environment 190 or in a different computing device altogether. In response to detecting spam messages, classifier 190 may quarantine the messages. In some cases, the messages in message database 170 may be used by an expert in the field of information technologies for the teaching of various decision making systems known from the prior art, including classifiers, which are used in particular for detecting spam messages.

Implementation of the method carried out by the above described system achieves a technical result involving the replenishing of message database 170, which may be used afterwards to improve the means of detecting spam messages or malicious software. In addition, the software used for spam messages is generally able to perform its malicious tasks within a short period of time—around a week, or sometimes longer—a month. The large varying time period exists because operations of the controlling command centers of the hackers change often. Malicious applications are able to receive commands only when the corresponding command center is active. If a command center is inactive, the malicious application will try to obtain commands from a non-operational command center, which are non-existent and thus, the electronic messages will not be received. The command center of hackers comprises complex hardware and software designed for remote control of applications, for example, by sending them commands by a given protocol. Accordingly, in order to obtain electronic messages by message selection module 160, it is important to select (using application selection module 130) an application 120 from application database 110 so as to increase the probability of selecting the electronic messages from the network activity log 150 generated during the execution of the application 120. This is achieved using the criteria discussed above for selecting an application.

Figure 2:
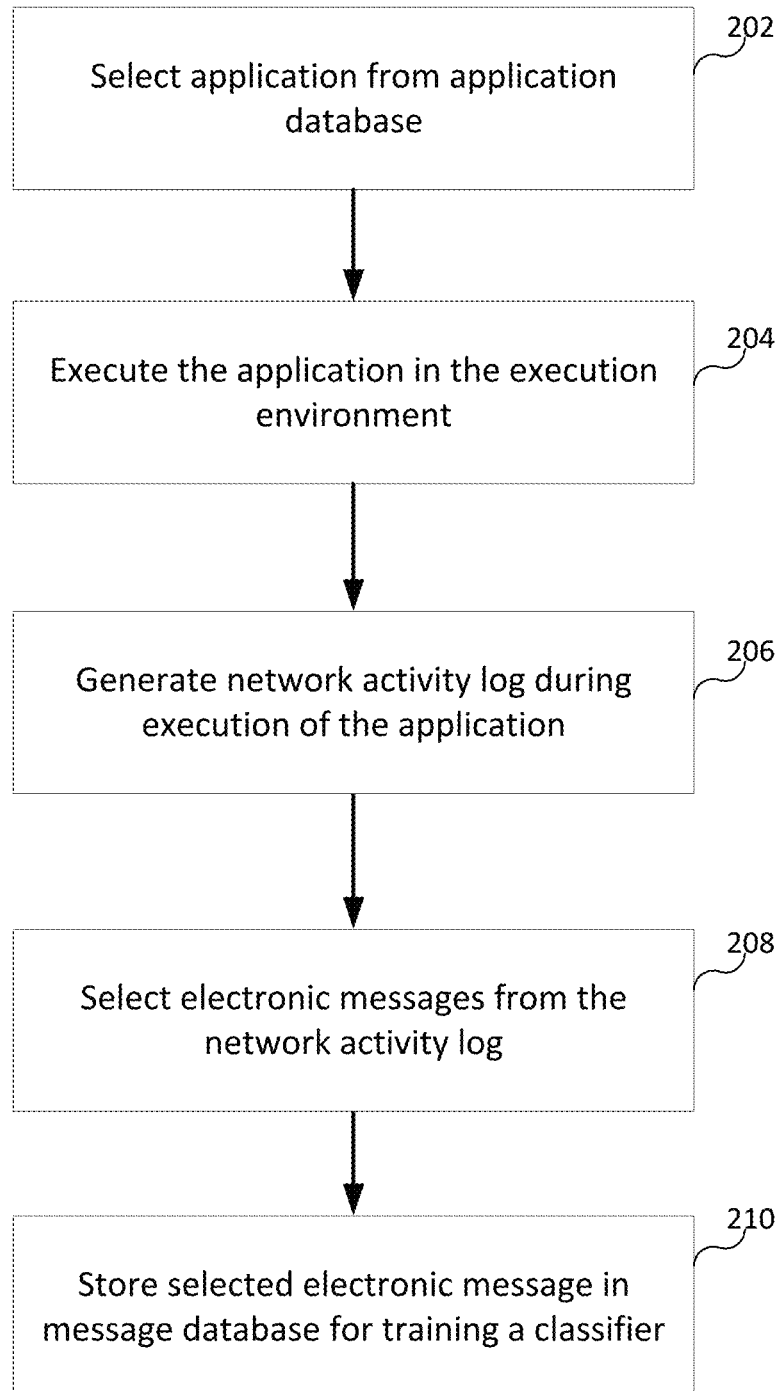
FIG. 2 illustrates a flow diagram of a method for storing identified malicious messages in a message database used as a training dataset for a classifier, in accordance with aspects of the present disclosure.

FIG. 2 illustrates a flow diagram of method 200 for storing identified malicious messages in a message database used as a training dataset for a classifier, in accordance with aspects of the present disclosure.

At 202, application selection module 130 may select application 120 from the application database 110. The application database 110 contains at least malicious applications and untrusted applications, and during the selection of application 120, application selection module 130 may determine the priority levels of the applications from database 110.

At 204, selected application 120 is sent to execution environment 101, where application 120 is executed. During the execution, at 206, network interception module 140 forms network activity log 150 by saving records containing information about the data being sent and received by execution environment 101 over network 180.

In some aspects, network interception module 140 may terminate generating log 150 in response to detecting that the execution of application 120 has ended. In some aspects, network interception module 140 may terminate generating log 150 in response to the expiration of a set interval of time (e.g., 5 minutes).

At 208, message selection module 160 may select electronic messages associated with application 120. An electronic message is determined to be associated with the application 120, by message selection module 160 if records from network activity log 150 are marked with the number of a network-level protocol port used by application 120 for performing data exchange over network 180. At 210, message selection module 160 may replenish message database 170 by adding to it the previously selected electronic messages.

Figure 3:
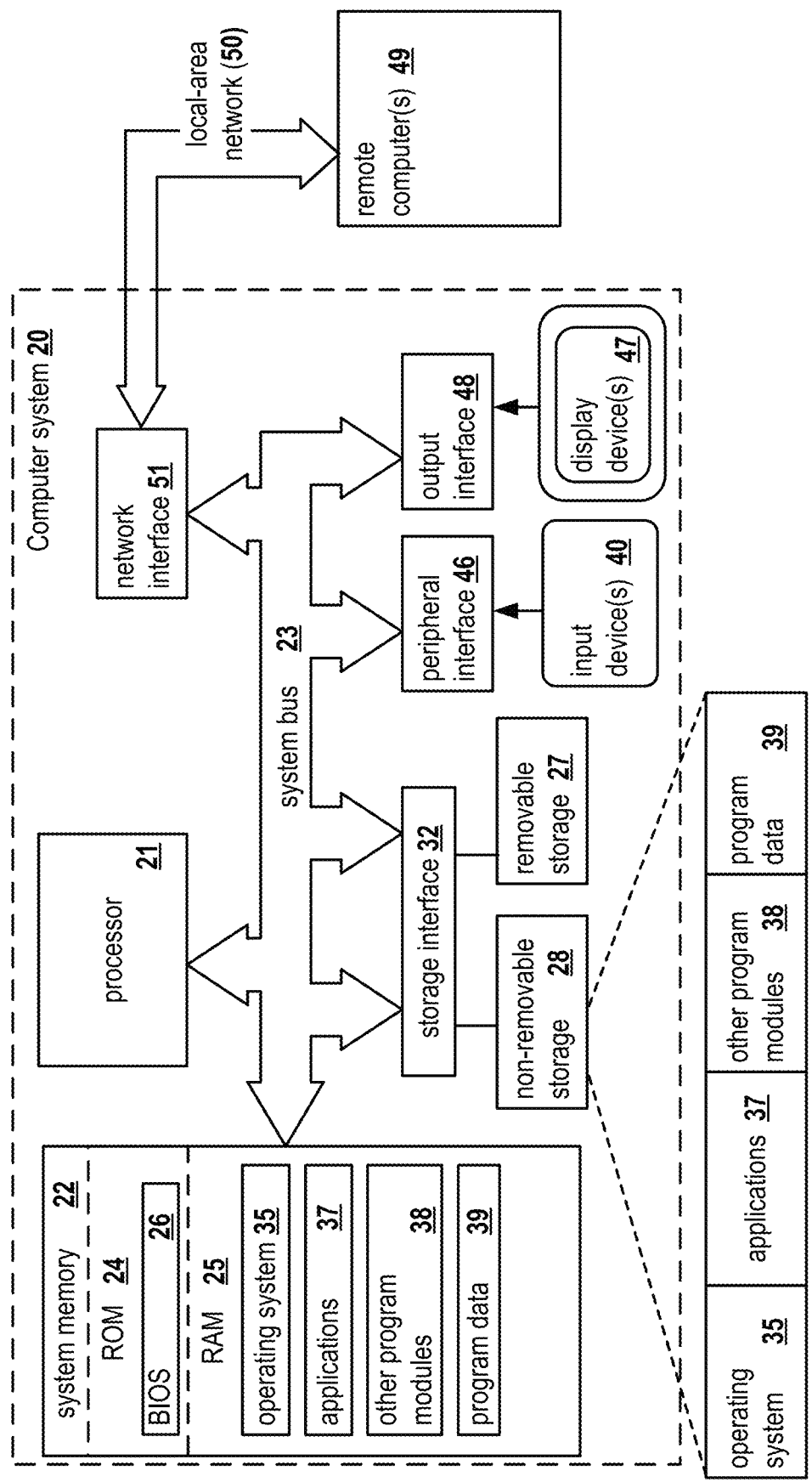
FIG. 3 presents an example of a general-purpose computer system on which aspects of the present disclosure can be implemented.

FIG. 3 is a block diagram illustrating a computer system 20 on which aspects of systems and methods for malicious message interception may be implemented in accordance with an exemplary aspect. The computer system 20 may represent execution environment 101 from FIG. 1 and can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for intercepting malicious messages for training a malware detection classifier, the method comprising:
    accessing an application database containing information about a plurality of applications, including malicious applications and untrusted applications;
    calculating a respective priority level for each application in the database based on a function of a number of computing devices on which the respective application was identified and an amount of time elapsed since the respective application was added or modified in the database;
    selecting an application with the greatest respective priority level among all other calculated priority levels for each application, for execution in an execution environment;
    during the execution of the selected application in the execution environment, monitoring network activity comprising information about data being sent and received over a network connected to the execution environment;
    extracting, from the network activity, an electronic message; and
    in response to determining that the electronic message corresponds to the selected application, storing the electronic message in a message database used for training the machine-learning based malware detection classifier.

2. The method of claim 1, wherein the respective priority level is inversely proportional to an amount of time elapsed since the respective application was added or modified in the application database.

3. The method of claim 1, wherein the respective priority level is directly proportional to the number of computing devices on which the respective application was identified.

4. The method of claim 1, wherein the calculating comprises:
    calculating the respective priority level based on a formula:

$$p = \frac{n^a}{t^b}$$

wherein p is the respective priority level, n is the number of computing devices on which the respective application was identified; t is the amount of time elapsed since the respective application was added or modified in the application database, and a and b are power coefficients, where a>b>0.

5. The method of claim 1, wherein the calculating comprises:
    assigning a maximum priority level to the respective application in response to determining that the respective application is capable of performing data exchanges over the network.

6. The method of claim 1, wherein determining that the electronic message corresponds to the selected application comprises:
    determining that the extracted electronic message is marked with an identifier of a network-level protocol port used by the selected application for performing data exchanges over the network.

7. The method of claim 1, wherein the execution environment is one of: a computing device, a hypervisor with a virtual machine running, and an emulator.

8. A system for intercepting malicious messages for training a malware detection classifier, the system comprising:
    a hardware processor configured to:
    access an application database containing information about a plurality of applications, including malicious applications and untrusted applications;
    calculate a respective priority level for each application in the database based on a function of a number of computing devices on which the respective application was identified and an amount of time elapsed since the respective application was added or modified in the database;
    select an application with the greatest respective priority level among all other calculated priority levels for each application, for execution in an execution environment;
    during the execution of the selected application in the execution environment, monitor network activity comprising information about data being sent and received over a network connected to the execution environment;
    extract, from the network activity, an electronic message; and
    in response to determining that the electronic message corresponds to the selected application, store the electronic message in a message database used for training the machine-learning based malware detection classifier.

9. The system of claim 8, wherein the respective priority level is inversely proportional to an amount of time elapsed since the respective application was added or modified in the application database.

10. The system of claim 8, wherein
the respective priority level is directly proportional to the number of computing devices on which the respective application was identified.

11. The system of claim 8, wherein the hardware processor is configured to perform the calculating by:
calculating the respective priority level based on a formula:

$$p = \frac{n^a}{t^b}$$

wherein p is the respective priority level, n is the number of computing devices on which the respective application was identified; t is the amount of time elapsed since the respective application was added or modified in the application database, and a and b are power coefficients, where a>b>0.

12. The system of claim 8, wherein the hardware processor is further configured to perform the calculating by:
assigning a maximum priority level to the respective application in response to determining that the respective application is capable of performing data exchanges over the network.

13. The system of claim 8, wherein the hardware processor is configured to determine that the electronic message corresponds to the selected application by:
determining that the extracted electronic message is marked with an identifier of a network-level protocol port used by the selected application for performing data exchanges over the network.

14. The system of claim 8, wherein the execution environment is one of: a computing device, a hypervisor with a virtual machine running, and an emulator.

15. A non-transitory computer readable medium storing thereon computer executable instructions for intercepting malicious messages for training a malware detection classifier, including instructions for:
accessing an application database containing information about a plurality of applications, including malicious applications and untrusted applications;
calculating a respective priority level for each application in the database based on a function of a number of computing devices on which the respective application was identified and an amount of time elapsed since the respective application was added or modified in the database;
selecting an application with the greatest respective priority level among all other calculated priority levels for each application, for execution in an execution environment;
during the execution of the selected application in the execution environment, monitoring network activity comprising information about data being sent and received over a network connected to the execution environment;
extracting, from the network activity, an electronic message; and
in response to determining that the electronic message corresponds to the selected application, storing the electronic message in a message database used for training the machine-learning based malware detection classifier.

16. The non-transitory computer readable medium of claim 15, wherein the respective priority level is directly proportional to the number of computing devices on which the respective application was identified.

17. The non-transitory computer readable medium of claim 15, wherein the respective priority level is inversely proportional to the amount of time elapsed since the respective application was added or modified in the application database.

18. The non-transitory computer readable medium of claim 15, including instructions for:
calculating the respective priority level based on a formula:

$$p = \frac{n^a}{t^b}$$

wherein p is the respective priority level, n is the number of computing devices on which the respective application was identified; t is the amount of time elapsed since the respective application was added or modified in the application database, and a and b are power coefficients, where a>b>0.

* * * * *